(12) United States Patent
Menn et al.

(10) Patent No.: US 8,752,102 B2
(45) Date of Patent: Jun. 10, 2014

(54) INTELLIGENT RETRANSMISSION OF DATA STREAM SEGMENTS

(75) Inventors: Valerian Menn, Redmond, WA (US); Nicholas Fang, Redmond, WA (US); Gurpratap Virdi, Bellevue, WA (US); Todd Bowra, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1573 days.

(21) Appl. No.: 11/969,216

(22) Filed: Jan. 3, 2008

(65) Prior Publication Data

US 2009/0178087 A1 Jul. 9, 2009

(51) Int. Cl.
*H04N 7/173* (2011.01)
*H04N 21/4147* (2011.01)
*H04N 21/433* (2011.01)
*H04N 21/443* (2011.01)

(52) U.S. Cl.
CPC ....... *H04N 21/4147* (2013.01); *H04N 21/4334* (2013.01); *H04N 21/443* (2013.01)
USPC ............................................ 725/93; 725/116

(58) Field of Classification Search
CPC combination set(s) only.
See application file for complete search history.

(56) References Cited

U.S. PATENT DOCUMENTS

| | | | |
|---|---|---|---|
| 5,442,637 A * | 8/1995 | Nguyen | 714/708 |
| 5,627,970 A | 5/1997 | Keshav | |
| 5,784,527 A | 7/1998 | Ort | |
| 5,918,002 A * | 6/1999 | Klemets et al. | 714/18 |
| 6,031,818 A | 2/2000 | Lo et al. | |
| 6,289,054 B1 | 9/2001 | Rhee | |
| 6,392,993 B1 | 5/2002 | Hamilton et al. | |
| 6,553,538 B2 * | 4/2003 | Zehavi | 714/784 |
| 6,651,103 B1 * | 11/2003 | Markowitz et al. | 709/231 |
| 7,051,358 B2 | 5/2006 | Hakenberg et al. | |
| 7,164,680 B2 | 1/2007 | Loguinov | |
| 7,224,702 B2 | 5/2007 | Lee | |
| 2002/0191594 A1 * | 12/2002 | Itoh et al. | 370/352 |
| 2003/0126238 A1 * | 7/2003 | Kohno et al. | 709/220 |
| 2004/0063466 A1 * | 4/2004 | Fujii et al. | 455/561 |
| 2007/0115841 A1 | 5/2007 | Taubman et al. | |
| 2007/0206497 A1 | 9/2007 | Plamondon et al. | |

OTHER PUBLICATIONS

Perkins, et al., "A Survey of Packet-Loss Recovery Techniques for Streaming Audio", Morgan Kaufmann Publishers Inc. 2001. pp. 1-15.
Feamster, et al., "Packet Loss Recovery for Streaming Video", 12th International Packet Video Workshop, 2002. pp. 1-11.
Papadopoulos, et al., "Retransmission-Based Error Control for Continuous Media Applications", NOSSDAV 1996. pp. 8.
Chen, et al., Multi-Stages Hybrid ARQ with Conditional Frame Skipping and Reference Frame Selecting Scheme for Real-Time Video Transport Over Wireless LAN, IEEE Transactions on Consumer Electronics, vol. 50, No. 1, Feb. 2004, IEEE, pp. 158-167.

* cited by examiner

*Primary Examiner* — Mark D Featherstone
(74) *Attorney, Agent, or Firm* — Micah Goldsmith; Glen Johnson; Micky Minhas

(57) ABSTRACT

An intelligent retransmission of data stream segments is disclosed. One embodiment comprises detecting a missing media data segment at a media receiver, assigning a value to the missing media data segment based upon media playback consequences of not utilizing the missing media data segment, comparing the value with a threshold, and requesting retransmission of the missing media data segment from a media server if the value meets a predetermined condition relative to the threshold. In this manner, retransmission is requested when it is determined that retransmission will improve playback performance relative to non-retransmission.

20 Claims, 3 Drawing Sheets

INTELLIGENT RETRANSMISSION OF DATA STREAM SEGMENTS

BACKGROUND

As computing and communication networks continue to evolve, media is increasingly being stored, shared, and played over these networks. However, network-based media players can be adversely impacted by network constraints. For example, a wireless network may not have sufficient bandwidth for glitch-free playback of streamed media.

Some network-based media players enable a user to stream PC-based TV and media content to network-connected consumer electronics devices elsewhere in the home. When connected via a wireless network, such media players may experience packet loss during media streaming. When confronted with packet loss, a media player has two choices. First, the media player may skip the lost packets and play what content it has. This may result in image corruption onscreen, audio glitches, etc. Second, the media player may request retransmission of the lost packets and delay playback until those packets are received. This may result in the playback pausing during retransmission. Current media players may hard code one of these two strategies, or may use a static combination of these two strategies. For example, a media player may be hard coded to request one retransmission, and if a lost packet is not received after retransmission, then to play what content it has. As a result a user may have a less than optimal experience when packets are lost on the network.

SUMMARY

Accordingly, various embodiments for intelligent retransmission of media data are described below in the Detailed Description. For example one embodiment comprises detecting a missing media data segment at a media receiver, assigning a value to the missing media data segment based upon media playback consequences of not utilizing the missing media data segment, comparing the value with a threshold, and requesting retransmission of the missing media data segment from a media server if the value meets a predetermined condition relative to the threshold. In this way, the media receiver can request retransmission of the missing media data in an intelligent manner to provide a better playback experience.

This Summary is provided to introduce a simplified form of concepts that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
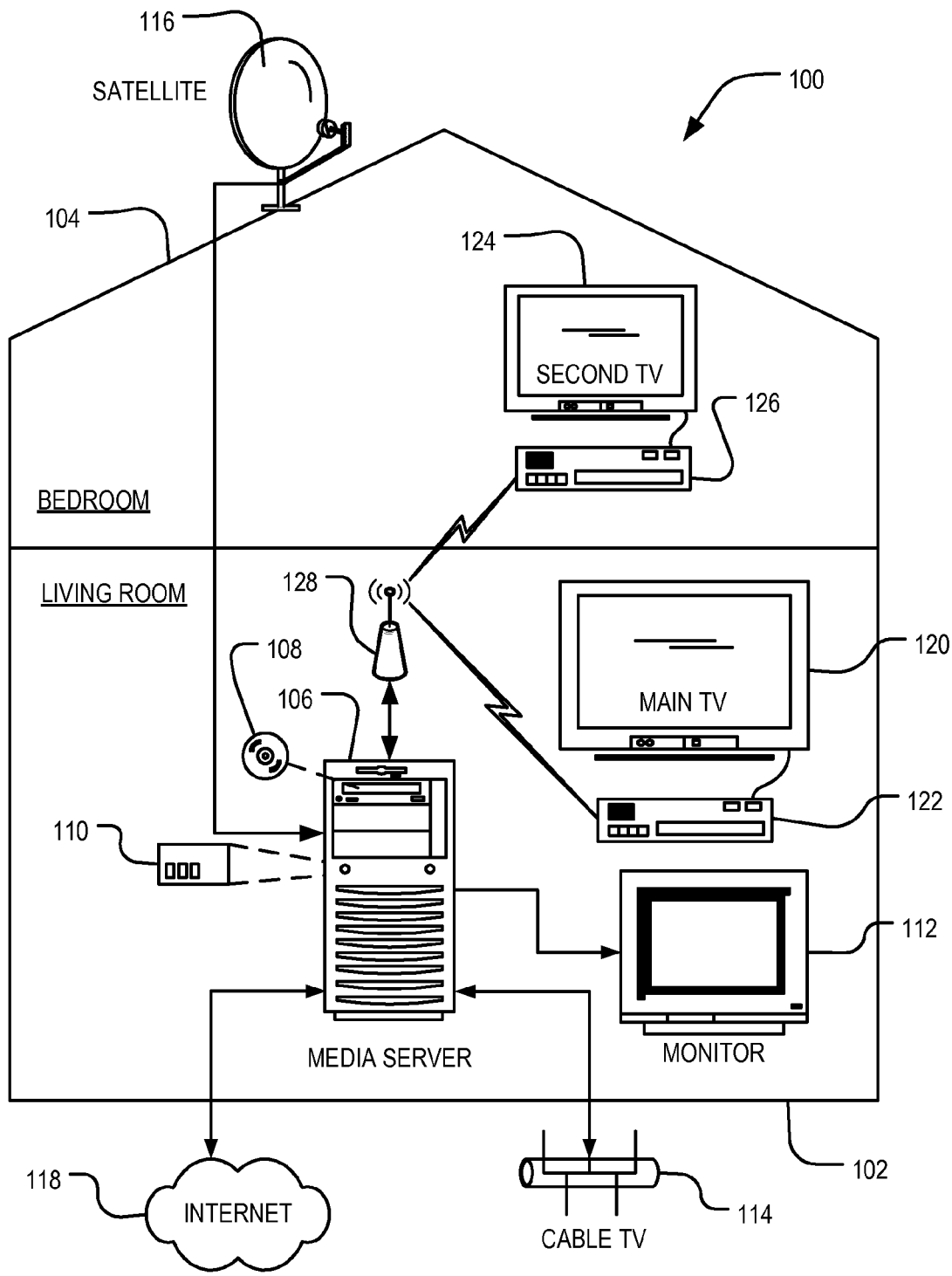
FIG. 1 shows an example of an embodiment of a home media environment.

Prior to discussing embodiments for intelligent retransmission of media data segments, an example streaming media use environment is described. FIG. 1 depicts an exemplary home entertainment environment 100, including a living room 102 and a bedroom 104. Central to the home entertainment environment 100 is a media server 106, in this implementation situated in the living room 102, but which could be located anywhere within the house or in communication with devices in the house through a network 128. In one implementation, the media server 106 is a conventional personal computer (PC) configured to run a multimedia software package, for example, a Windows Vista Ultimate operating system with Windows Media Center (available from Microsoft Corporation of Redmond, Wash.). In such a configuration, the media server 106 is able to integrate full computing functionality with a complete home entertainment system into a single PC. For example, a user can watch television (TV) in one graphical window of an attached video monitor 112, while sending e-mail or working on a spreadsheet in another graphical window on the same monitor 112. In addition, the media server 106 may also include other features or components, for example: a digital video recorder (DVR) to capture video content for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, data, media, and home videos; and an electronic program guide (EPG) (not shown in FIG. 1).

Instead of a conventional PC, the media server 106 may comprise a variety of other devices capable of storing and distributing media data, including, for example, a notebook or portable computer, a tablet PC, a workstation, a server, an Internet appliance, a DVR, or combinations thereof. The media server 106 may also be a set-top box capable of delivering media data to a computer where it may be streamed, or the set-top box itself could stream the media data. As the media server 106 may be a full function computer running an operating system, the user may also have the option to run standard computer programs (e.g., word processing and spreadsheets), send and receive e-mails, browse the Internet, or perform other functions.

In addition to storing media data, the media server 106 may be connected with a variety of media sources, for example, a cable connection 114, a satellite receiver 116, an antenna (not shown), and/or a network such as the Internet 118. A user may thus control a live stream of media data (e.g., TV content) received, for example, via the cable connection 114, the satellite receiver 116, or antenna. This capability may be enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of content. Alternately, the user may employ an SD tuner for SD content and an HD tuner for HD content separately.

The TV content may be received as an analog (i.e., radio frequency) signal or a digital signal (e.g., digital cable). The received TV content may include discrete content packets, where each content packet includes actual TV content (i.e., audio and video data). If TV content is received as an analog signal, discrete content packets may be created from the analog signal.

The entertainment environment 100 may also include one or more network devices functioning as media receivers 122, 126 placed in communication with the media server 106 through a network 128, for example, a local area network (LAN). In an exemplary embodiment, each media receiver 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, an Internet appliance, a handheld PC, a cellular telephone or other wireless communications device, a personal digital assistant (PDA), a network capable device, or combinations thereof. Furthermore, the media receivers 122, 126 may include a tuner as described above.

The network 128 may comprise a wired and/or wireless network, for example, cable, Ethernet, WiFi, a wireless access point (WAP), or any other electronic, radio frequency or optical coupling means, including the Internet. The network 128 may enable communication between the media server 106, the media receivers 122 and 126, and any other connected device through packet-based communication protocols, such as Transmission Control Protocol (TCP), Internet Protocol (IP), Real-time Transport Protocol (RTP), User Datagram Protocol (UDP) and Real-time Transport Control Protocol (RTCP), or other packet based communication protocols, as examples. Communications may be transmitted directly between devices over a LAN, or they may be carried over a wide area network (WAN), for example, the Internet 118.

Entertainment environment 100 may include one or more video display devices, for example a main TV 120 in the living room 102, a secondary TV 124 in the bedroom 104, and a video monitor 112 in the entertainment environment 100. These video display devices may be connected with the media server 106 via the network 128 either directly or via the media receivers 122, 126. As shown in the example of FIG. 1, the main TV 120 and the secondary TV 124 may be coupled to the media receivers 122, 126 through conventional cables. The video monitor 112 may be coupled with the media server 106 directly via a video cable. The media server 106 and media receivers 122, 126 may alternatively be coupled with any of a variety of video and audio presentation devices and may be coupled using couplings other than conventional cables. Media data, including TV content, may thus be supplied to each of the video display devices 112, 120, 124 over the home network 128 from the media server 106 situated in the living room 102.

The media receivers 122, 126 may be configured to receive streamed media data, including video and TV content, from the media server 106. Media data, and particularly video and TV content, may be transmitted from the media server 106 to the media receivers 122, 126 as streaming media comprised of discrete content packets via the network protocols described above, or even other network protocols. The streamed media data may comprise IPTV (television content delivered over the Internet), SD, and HD content, including video, audio, and image files, decoded on the media receivers 122, 126 for presentation on the connected TVs 120, 124 or monitor 112. The media data may further be "mixed" with additional content, for example, an Electronic Program Guide (EPG), presentation content related to the media data, a web browser window, and other user interface environments transmitted from the media server for output on the TVs 120, 124 or the monitor 112. Such additional media data may be delivered in a variety of ways using different protocols, including, for example, standard Remote Desktop Protocol (RDP), Graphics Device Interface (GDI), Hypertext Markup Language (HTML), or other protocols providing similar functionality.

In addition to the media receivers 122, 126 and the video display devices 112, 120, 124, the media server 106 may be connected with other peripheral devices, including components such as a DVR, cable or satellite set-top boxes, speakers, a printer (not shown), etc. The media server 106 and/or media receivers 122, 126 may also enable multi-channel output for speakers. This may be accomplished through the use of digital interconnect outputs, such as Sony-Philips Digital Interface Format (S/PDIF) or TOSLINK®, enabling the delivery of Dolby Digital, Digital Theater Sound (DTS), or Pulse Code Modulation (PCM).

Prior to discussing embodiments of intelligent retransmission of media data segments in detail, it will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. As used herein, the term "program" may connote a single program or multiple programs acting in concert, and may be used to denote applications, services, or any other type or class of program. Likewise, the terms "computer" and "computing device" as used herein include any device that electronically executes one or more programs, including, but not limited to, media server 106, media receivers 122, 126, and any other suitable device such as personal computers, servers, laptop computers, hand-held devices, cellular phones, microprocessor-based programmable consumer electronics and/or appliances, routers, gateways, hubs and other computer networking devices.

Figure 2:
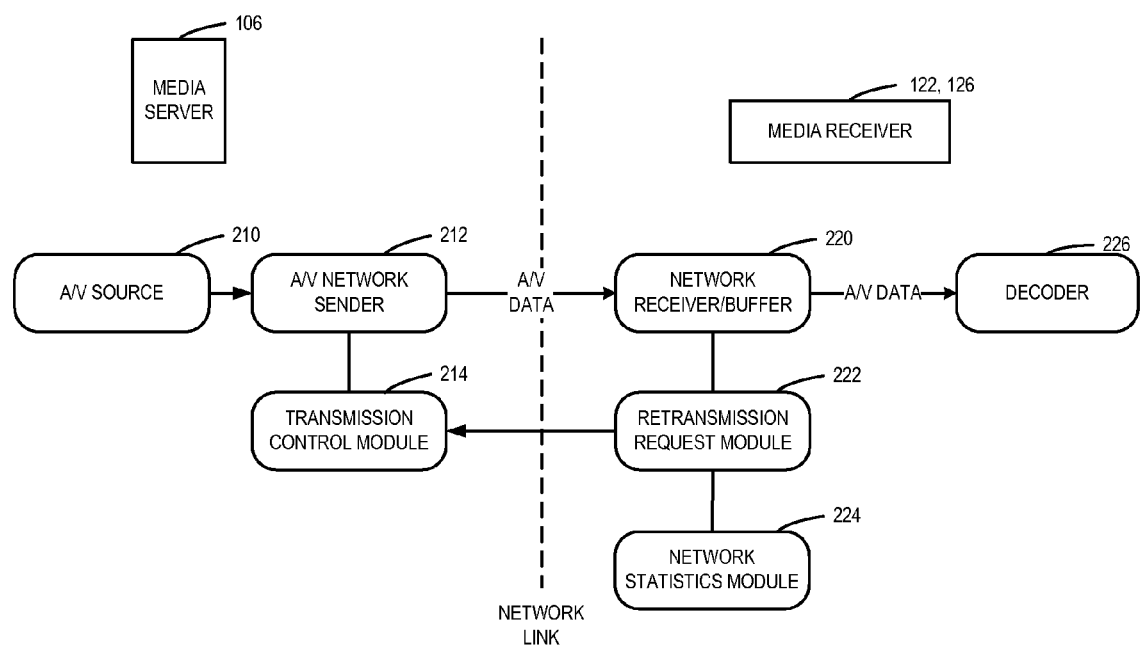
FIG. 2 shows a block diagram of embodiments of a media server and a media receiver of the home media environment of FIG. 1.

FIG. 2 shows a block diagram of a media server 106 and a media receiver 122 or 126 of the embodiment of FIG. 1. While the disclosure below of the media receiver is made primarily with reference to media receiver 122, it will be understood that the disclosure also extends to media receiver 126, as well as other suitable media receivers. Further, while media receiver 122 may be described herein as a playback device, it will be understood that a media receiver may instead be coupled with a separate media playback device.

Media server 106 includes an audio/video (A/V) source 210 coupled to an A/V network sender 212 to transmit media data over a network link to media receiver 122 for playback. Media server 106 also includes a transmission control module 214 coupled to A/V network sender 212. Transmission control module 214 is configured to receive retransmission requests over a network link and forward them to A/V network sender 212.

As depicted in the embodiment in FIG. 2, media receiver 122 includes a network receiver/buffer 220 configured to receive A/V data from A/V network sender 212, and a decoder 226 coupled with media receiver/buffer 220. Media receiver 122 further includes a retransmission request module 222 in communication with network receiver/buffer 220. Retransmission request module 222 is also in communication with a network statistics module 224 configured to track statistics related to network performance characteristics. While the network statistics module 224 is depicted as residing on the media receiver 122 in FIG. 2, in other embodiments the network statistics module 224 may reside on the media server 106, or on a third device. Retransmission request module 222 may receive statistical network performance data from network statistics module 224 and utilize the network performance data in making retransmission determinations.

Retransmission request module 222 is also in communication with transmission control module 214 over a network link, and is configured to selectively send retransmission requests to transmission control module 214. Retransmission request module 222 is described in more detail in the following paragraphs.

In some embodiments, retransmission request module 222 may comprise retransmission request logic that allows retransmission request module 222 to decide whether or not to request retransmission of a data frame with missing data. Further, in some embodiments, retransmission request module 222 may be configured to decide whether or not to request retransmission of a portion of a missing frame, as opposed to an entire frame, or any other suitable media data segment. Retransmission request module 222 may utilize various inputs or factors (singular or multiple) to make the determination whether to request retransmission of lost media data from A/V network sender 212. Examples of suitable inputs include, but are not limited to, the proximity of the lost media data to the current playback position; the type of lost data (e.g. frame type: key frame or predictive frame); the media file format (e.g. Windows Media Video (WMV) data, MPEG-2 (Motion Picture Experts Group) data, audio or video data, etc.); the relative fullness of network receiver buffer 220; network statistics related to available network bandwidth; user preferences; etc. Some embodiments may utilize a single factor to make a determination of whether to request retransmission of an incomplete data frame or lost data packets, while other embodiments may utilize a composite of factors to arrive at a retransmission determination.

The decision of whether to request retransmission may be made based on any suitable factor. For example, in some embodiments, the decision of whether to request retransmission may be based upon the determined consequences on playback quality of not retransmitting the lost media data compared to retransmitting the lost media data. Retransmission of the media data may be requested when it would improve media playback, and not requested when it would degrade media playback.

As a more specific example, in one embodiment, when a packet is lost over a network, the retransmission request logic may evaluate if the lost packet is within a threshold proximity of the current playback position. If the lost packet is within the threshold proximity, then the logic may determine that playback will glitch regardless of whether the lost packet is retransmitted. In this case, the logic may determine whether retransmitting or skipping the lost packet would result in a smaller disruption to the media playback experience.

For example, retransmission may cause a pause in playback while the packet is being retransmitted, whereas non-retransmission may cause corrupted playback due to the missing data. In such situations, the retransmission request logic may determine which interruption is less disruptive to a user, and then determine whether or not to retransmit accordingly. This determination may be based upon any relevant factors, including but not limited to, those listed above. For example, WMV data may have key frames that are spaced relatively far apart (e.g. on the order of seconds). Thus, if the missing packet contains media data from a WMV key frame, not requesting retransmission may result in poor playback performance for several seconds until the next key frame is played. In contrast, requesting retransmission of the packet may result in a video pause for a few hundred milliseconds. This may have a much smaller impact on the playback experience.

In another example, if the lost data or lost media data segment is from a WMV bi-directionally predicted frame, the quality of a displayed image may be less severely impacted by missing data than where the lost data is from a key frame. Therefore, proceeding with playback without retransmission may result in a glitch of only 33 ms or so, which may be less noticeable than a pause in playback. In this case, the retransmission request logic may determine not to request retransmission.

In some embodiments, retransmission request module 222 may request retransmission of an entire frame if data from the frame is missing. In other embodiments, retransmission request module 222 may request the retransmission of only the missing media data segment. Media data frames such as WMV frames, MPEG-2 frames, etc. are often sent over a network using transport layer protocols such as User Datagram Protocol (UDP), or other transport layer protocols. The media data frames are often a different size than the transport layer protocol packets. For example, a WMV key frame may be substantially larger than 64 Kilobytes (KB) while a UDP packet may be 1460 bytes. Therefore, instead of a 1:1 mapping between media frames and transport packets, media frames may be distributed over multiple packets.

In such cases, the retransmission request logic may be configured to make decisions regarding how many packets/bytes to have retransmitted in order to sufficiently complete an incomplete media data frame. For example, if the number of packets needed to complete the media frame is low as compared to the relative importance of the media frame to playback quality, the retransmission request logic may request retransmission. On the other hand, if the number of packets needed is high as compared to the relative importance of the frame, the retransmission request logic may refrain from requesting retransmission. However, embodiments are not so limited, and retransmission determinations can be based upon retransmission of any measure of data (e.g. packets, frames, portions of data streams, etc.).

In the depicted embodiment, the retransmission logic is described as residing on media receiver 122, however, in other embodiments the retransmission logic may reside on media server 106, or even on another device in communication with media receiver 122 or media server 106. For example, media receiver 122 may report missing packets to media server 106, and media server 106 may determine which data to retransmit. In some embodiments, media server 106 may also inform media receiver 122 which packets are being retransmitted and which lost packets may be ignored.

Figure 3:
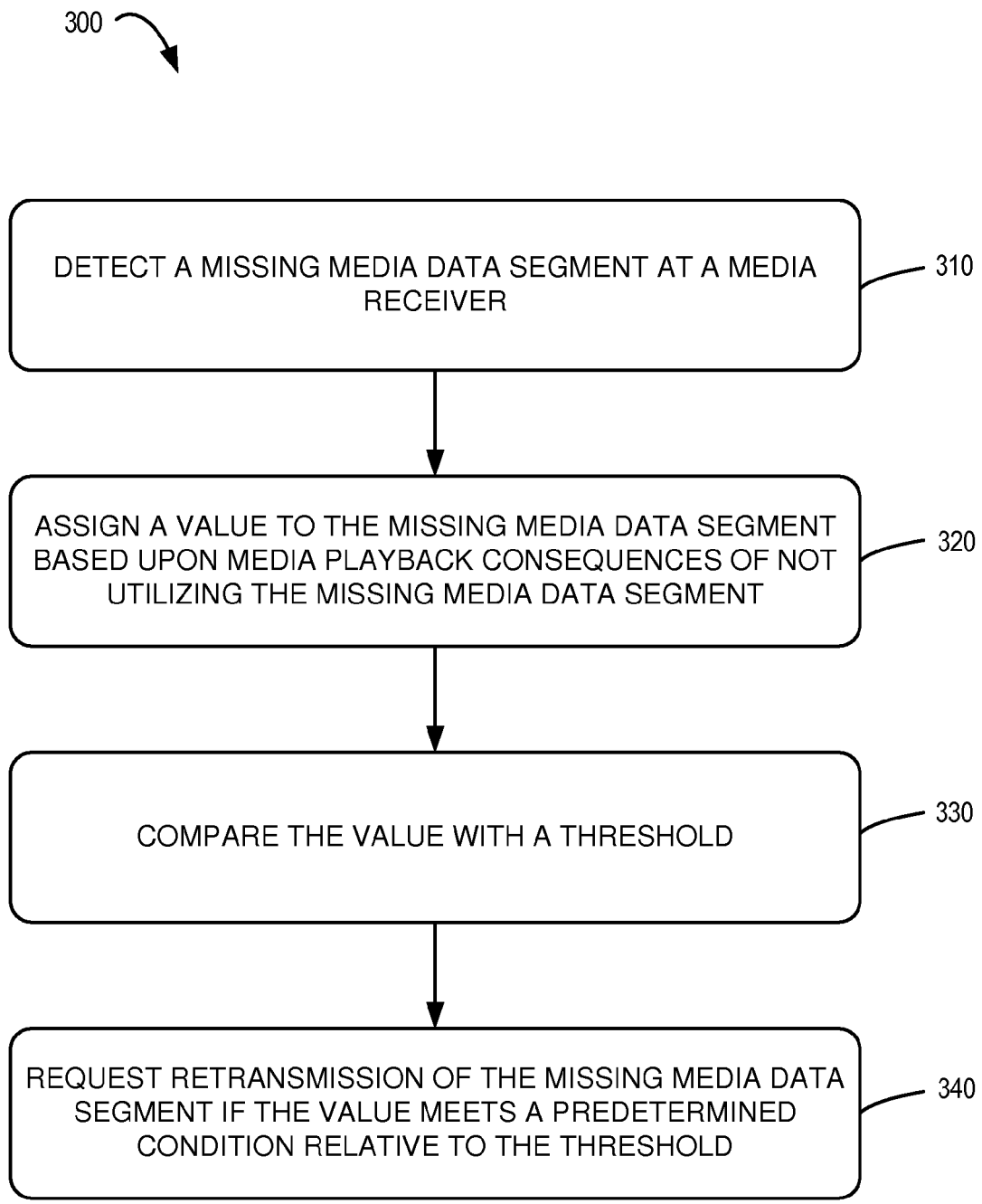
FIG. 3 shows a process flow depicting an embodiment of a method for intelligent retransmission of a media data segment.

FIG. 3 shows a flow diagram of an embodiment of a method 300 for streaming media data over a network utilizing the intelligent retransmission of media data segments. First, in block 310, method 300 detects a missing media data segment at a media receiver 122. Then, the method assigns a value to the missing media data segment based upon media playback consequences of not utilizing the missing media data segment in block 320. For example, in one embodiment, the missing media data segment may be assigned a first value for key frame data and a second value for predictive frame data. In other embodiments, values may be assigned based upon a media file type, a proximity of the missing media data segment to a current playback location, a relative fullness of network receiver/buffer 220, a media data type, or based on other suitable factors. Next, the assigned value is compared with a threshold in block 330. Then, as shown in block 340, method 300 requests retransmission of the missing media data segment if the value is above the threshold, or has another suitable predetermined condition relative to the threshold (for example, greater than or equal to, etc.).

The term "value" as used herein refers generally to a quantification or qualification of missing media data segments that allows a determination of whether to request data retransmission to be made. The term may refer to any suitable data type, for example a string, a digit, an alphanumerical character, etc., or any other suitable representation of value. As an example, in assigning a value to a missing media data segment, the value may be or represent a determination of relative worth, merit, or importance of the media data segment and may be characterized by any given data type explained above, as well as other suitable characterizations.

Any suitable determination or determinations may be used to assign a value to the missing media data segment. For example, some embodiments may assign a value to the missing media data segment based on characteristics of the data, upon playback or transmission characteristics, or based on other factors. As a specific example, in one embodiment, a proximity of the missing media data segment in a data stream may be compared to a current playback position. In this case, a value may be assigned that indicates that retransmission is not to be requested if the missing media data segment cannot be retrieved before playback.

In other embodiments, a value may be assigned to the missing media data segment based upon one or more characteristics of the frame with the missing data. For example, a value assigned on this basis may reflect whether a frame is a key frame or a predictive frame. In these embodiments, a higher value (i.e. favoring retransmission) may be given to a key frame. In some embodiments, a higher value may be assigned to audio data than to video data, as gaps in audio data may be perceived more easily by a user than gaps in video data. In other embodiments, a higher value may be assigned to video data than for audio data, as the loss of a video key frame may cause a disruption of a longer duration than the loss of an audio frame. Whether audio is assigned a higher or lower value than video may depend upon various factors, such as a user-set preference for one or the other.

A value also may be assigned based on available buffer space in a media receiver 122, on current or average network bandwidth determined by network statistics or performance measurements, on a user set preference, on the type of media data stream, etc. For example, a higher value may be assigned to represent more available buffer space and a lower value for less available buffer space. Likewise, a higher value may be assigned to represent more available network bandwidth.

Further, a value may be assigned based upon user preferences that define different propensities of retransmission based upon characteristics of the media content. For example, a user preference setting may be set to a high propensity to retransmit for a high-definition movie to take advantage of the playback quality, but to a lower propensity to retransmit for a sporting event or the like to enhance the real-time nature of the event retransmission.

It will be understood the word "higher value" is used herein to describe a weighting toward retransmission compared to non-retransmission, and not necessarily a higher magnitude. Further, while described herein in the context of a home streaming media environment, it will be appreciated that the concepts disclosed herein may be used in any suitable streaming media environment, including but not limited to other client-server-based use environments and peer-to-peer-based use environments. Additionally, while the media server and media receiver are shown herein as being located on different devices, it will be understood that these components may comprise separate components, modules, programs or other entities running on a single device.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method of intelligently requesting retransmission of a media data segment in a data stream, the method comprising:
   receiving at the computing device a user input setting a user preference that defines a propensity for retransmission of data;
   detecting via the computing device a missing media data segment;
   assigning a value to the missing media data segment based upon the user preference;
   comparing the value with a threshold; and
   requesting retransmission of the missing media data segment from a media server if the value meets a predetermined condition relative to the threshold.

2. The method of claim 1, further comprising detecting a proximity of the missing media data segment in the data stream to a current playback position in the data stream, and not requesting retransmission if the missing media data segment cannot be retrieved before playback.

3. The method of claim 1, wherein assigning a value to the missing media data segment further comprises determining a type of frame comprising the missing media data segment, wherein the frame is assigned a higher value if it is a key frame than if it is a predictive frame.

4. The method of claim 1, wherein assigning a value to the missing media data segment further comprises determining how much buffer space is available on a media receiver, and assigning a value based upon the available buffer space.

5. The method of claim 1, wherein assigning a value to the missing media data segment further comprises determining a network bandwidth and assigning a value based upon the network bandwidth.

6. The method of claim 1, wherein assigning a value to the missing media data segment further comprises assigning a value based upon whether the missing media data segment is audio data or video data.

7. The method of claim 1, wherein assigning a value to the missing media data segment further comprises assigning a first value if the missing data segment comprises a low number of data packets compared to a relative importance of the missing data segment in playback quality, and assigning a second value if the missing data segment comprises a high number of data packets compared to the relative importance of the missing data segment in playback quality.

8. A computer-readable memory comprising instructions executable by a computing device to enable intelligent retransmission of a media data segment in a data stream of media content, the instructions being executable to perform a method comprising:
   receiving at the computing device a user input setting a user preference that defines a propensity for retransmission of data;

detecting at the computing device a missing media data segment at a media receiver, wherein the media data segment comprises key frame data or predictive frame data, and the media data segment was sent over a network from a media server;

assigning a value to the missing media data segment based upon media playback consequences of not utilizing the missing media data segment, wherein the value is based upon a plurality of parameters including a user set the user preference for the data stream and whether the data segment comprises key frame data or predictive frame data;

comparing the value with a threshold; and requesting retransmission of the missing media data segment from the media server if the value meets a predetermined condition relative to the threshold.

9. The computer-readable storage medium of claim 8, further comprising instructions for detecting a proximity of the missing media data segment in the data stream to a current playback position in the data stream, and not requesting retransmission if the missing media data segment cannot be retrieved before playback.

10. The computer-readable storage medium of claim 8, wherein assigning a value to the missing media data segment based upon media playback consequences further comprises determining available buffer space on the media receiver, and assigning a higher value for more available buffer space and a lower value for less available buffer space.

11. The computer-readable storage medium of claim 8, wherein assigning a value to the missing media data segment based upon media playback consequences further comprises determining a network bandwidth and assigning a value based upon the network bandwidth.

12. The computer-readable storage medium of claim 8, wherein assigning a value to the missing media data segment based upon media playback consequences further comprises assigning a value based upon whether the missing media data segment is audio data or video data.

13. The computer-readable storage medium of claim 8, wherein assigning a value to the missing media data segment based upon media playback consequences further comprises assigning a first value if the missing data segment comprises a low number of data packets compared to a relative importance of the missing data segment in playback quality, and assigning a second value if the missing data segment comprises a high number of data packets compared to the relative importance of the missing data segment in playback quality.

14. A computing device comprising:
a computer-readable storage medium; and
instructions stored on the computer-readable storage medium, the instructions being executable by the computing device to run a network media receiver that receives media content, the network media receiver comprising:
  a network buffer to receive and buffer an encoded media data segment from a media server;
  a decoder coupled with the network buffer, the decoder to decode the media data segment for playback; and
  a retransmission request module coupled with the network buffer, the retransmission request module being configured to:
    receive a user input setting a user preference that defines a propensity for retransmission of data;
    detect a missing media data segment;
    assign a value to the missing media data segment based upon media playback consequences of not utilizing the missing media data segment, said value based upon a plurality of parameters including the user preference;
    compare the value with a threshold;
    request retransmission of the missing media data segment from the media server if the value meets a predetermined condition relative to the threshold.

15. The computing device of claim 14, wherein the retransmission request module is configured to detect a proximity of the missing media data segment in a data stream to a current playback position in the data stream, and to not request retransmission if the missing media data segment cannot be retrieved without degrading media playback.

16. The computing device of claim 14, wherein the retransmission request module is configured to assign a higher value to a key frame than to a predictive frame.

17. The computing device of claim 14, wherein the retransmission request module is configured to assign a higher value to the missing media data segment if there is more buffer space available in the network buffer.

18. The computing device of claim 14, further comprising a network statistics module coupled with the retransmission request module, wherein the retransmission request module receives network performance statistics from the network statistics module and the retransmission request module is configured to assign a higher value to the missing media data segment as network performance improves.

19. The computing device of claim 14, wherein the retransmission request module is configured to assign a first value for audio data and a second value for video data.

20. The computing device of claim 14, wherein assigning a value to the missing media data segment based upon media playback consequences further comprises assigning a first value if the missing data segment comprises a low number of data packets compared to a relative importance of the missing data segment in playback quality, and assigning a second value if the missing data segment comprises a high number of data packets compared to the relative importance of the missing data segment in playback quality.

* * * * *